(12) United States Patent
Reese

(10) Patent No.: US 12,384,202 B2
(45) Date of Patent: Aug. 12, 2025

(54) PNEUMATIC VEHICLE TIRE

(71) Applicant: Continental Reifen Deutschland GmbH, Hannover (DE)

(72) Inventor: Wolfgang Reese, Peine (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 18/041,560

(22) PCT Filed: Jul. 27, 2021

(86) PCT No.: PCT/DE2021/200099
§ 371 (c)(1),
(2) Date: Feb. 14, 2023

(87) PCT Pub. No.: WO2022/033640
PCT Pub. Date: Feb. 17, 2022

(65) Prior Publication Data
US 2023/0294456 A1  Sep. 21, 2023

(30) Foreign Application Priority Data
Aug. 14, 2020 (DE) ............ 10 2020 210 392.5

(51) Int. Cl.
*B60C 9/22* (2006.01)
*B60C 9/00* (2006.01)
*B60C 9/20* (2006.01)

(52) U.S. Cl.
CPC .... *B60C 9/0042* (2013.01); *B60C 2009/0085* (2013.01); *B60C 2009/0092* (2013.01);
(Continued)

(58) Field of Classification Search
CPC ...... B60C 2009/228; B60C 2009/2233; B60C 2009/2238; B60C 2009/2242;
(Continued)

(56) References Cited

U.S. PATENT DOCUMENTS

2007/0006957 A1  1/2007  Nakajima
2013/0118667 A1*  5/2013  Reese ............... B60C 9/18
152/527

FOREIGN PATENT DOCUMENTS

CN  103038071 A  4/2013
CN  106457907 A  2/2017
(Continued)

OTHER PUBLICATIONS

Machine Translation: WO-2011147635-A1, Carole J, (Year: 2024).*
(Continued)

*Primary Examiner* — Kendra Ly
(74) *Attorney, Agent, or Firm* — Gregory Adams; Richard A. Wolf

(57) ABSTRACT

The invention relates to a pneumatic vehicle tire of radial construction having a tread (1), a radial carcass, a belt bandage (8) having at least two belt plies (8a, 8b) and having at least one belt bandage ply (9), which is arranged radially outside the belt, wherein the belt bandage ply comprises cords of at least two multifilament yarns twisted together which are arranged parallel to one another inside the belt bandage ply (9) and wherein the multifilament yarns are made of recycled polyethylene terephthalate (rPET). At a force of 1.56 cN/dtex the rPET cord (10) has an elongation of 2% to 5% at 20° C. and an elongation of 6% to 9% at 120° C., the sum of the breaking elongation of the rPET cord (10) and the heat shrinkage determined at 180° C. at a preload force of 0.01 cN/dtex and a time of exposure of two minutes is greater than 17%, and the rPET cord (10) has a heat shrinkage determined at 180° C. at a preload force of 0.01 cN/dtex and a time of exposure of two minutes of greater than 2.5%.

7 Claims, 1 Drawing Sheet

(52) U.S. Cl.
CPC *B60C 2009/2077* (2013.01); *B60C 2009/208* (2013.01); *B60C 9/2204* (2013.01); *B60C 2009/2214* (2013.01); *B60C 2009/2252* (2013.01); *B60C 2009/2257* (2013.01); *B60C 2009/2266* (2013.01); *B60C 2009/228* (2013.01)

(58) Field of Classification Search
CPC .... B60C 2009/2247; B60C 2009/2252; B60C 2009/2257; B60C 2009/2261; B60C 2009/2266; B60C 2009/2271; B60C 2009/2276; B60C 2009/2285; B60C 2009/229; B60C 2009/2295
See application file for complete search history.

(56) References Cited

FOREIGN PATENT DOCUMENTS

| | | | |
|---|---|---|---|
| DE | 102010036760 A1 | 2/2012 | |
| EP | 1671813 A1 | 6/2006 | |
| EP | 2576245 A1 | 4/2013 | |
| EP | 2708380 A1 | 3/2014 | |
| EP | 2759624 A1 | 7/2014 | |
| EP | 2576245 B1 | 10/2016 | |
| JP | 2004100087 A | 4/2004 | |
| JP | 2005112065 A | 4/2005 | |
| JP | 2006022435 A | 1/2006 | |
| JP | 2011153168 A | 8/2011 | |
| JP | 2013532605 A | 8/2013 | |
| JP | 2016196586 A | 11/2016 | |
| WO | WO-2011147635 A1 * | 12/2011 | ........... B60C 9/0042 |

OTHER PUBLICATIONS

International Search Report and Written Opinion dated Oct. 26, 2021 of International Application PCT/DE2021/200099 on which this application is based.
Japanese Office Action dated Feb. 15, 2024 corresponding to Japanese Patent Application No. 2023-507683.
CN Office Action dated Feb. 24, 2025 of counterpart Chinese Patent Application No. 202180055425.0.
Third Party Observations dated Mar. 3, 2025 of counterpart European Patent Application No. 21751972.7.

* cited by examiner

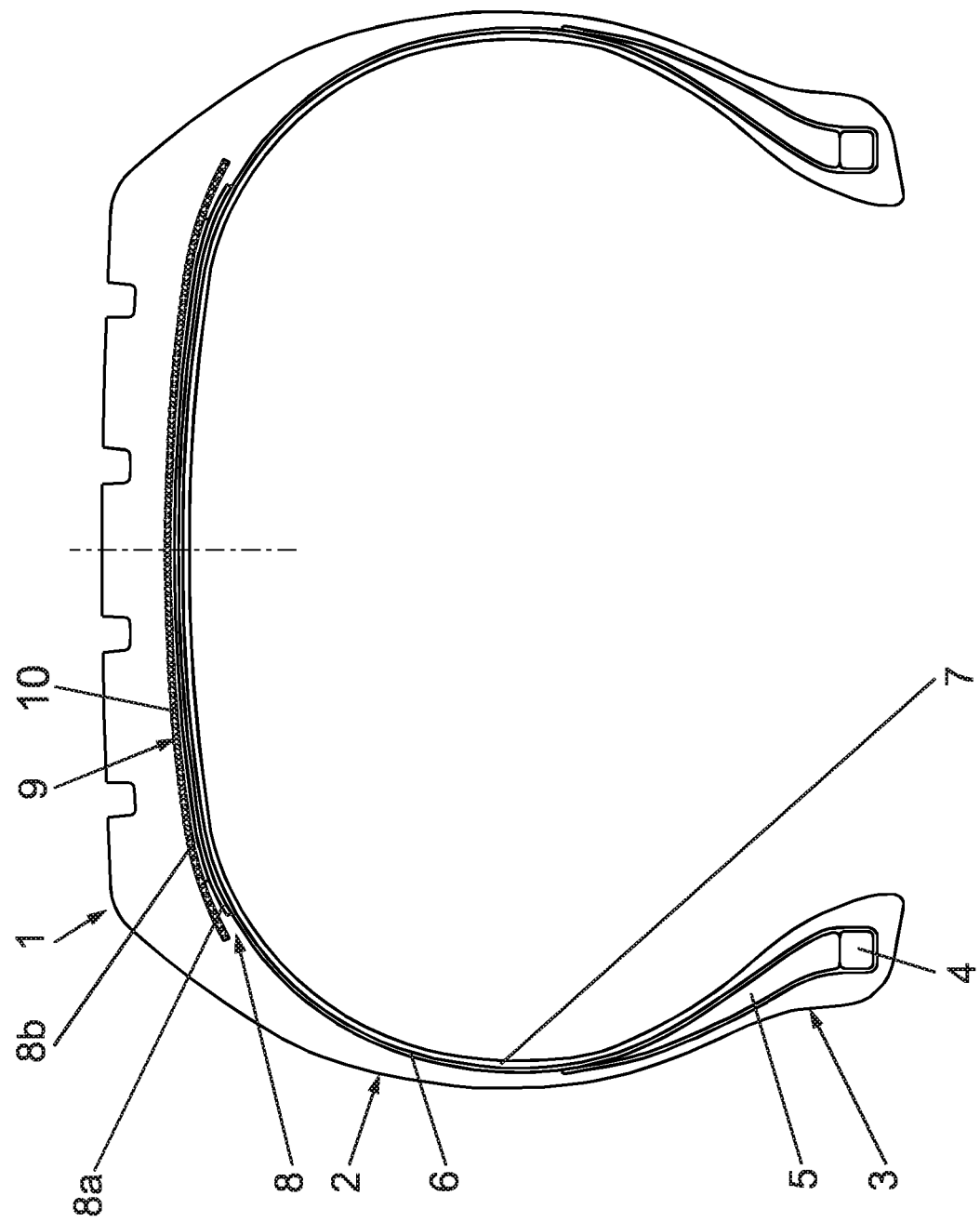

PNEUMATIC VEHICLE TIRE

The invention relates to a pneumatic vehicle tire of radial construction having a tread, a radial carcass, a belt bandage having at least two belt plies and having at least one belt bandage ply, which is arranged radially outside the belt, wherein the belt bandage ply comprises cords of at least two multifilament yarns twisted together which are arranged parallel to one another inside the belt bandage ply and wherein the multifilament yarns are made of recycled polyethylene terephthalate (rPET).

Such a pneumatic vehicle tire is known from EP 257 62 45 B1. Recycled PET (rPET) is not obtained directly from fossil raw materials but rather is 100% recovered from used end-of-life PET products, such as PET drinks bottles. Used PET material is cleaned, shredded and, using the melt-spinning process, extruded into a fiber which is further processed into multifilament yarns and cords. This reuse of used PET material for strength members of pneumatic vehicle tires is environmentally friendly and resource-saving.

Single- or multi-ply belt bandages are well known to those skilled in the art.

Furthermore, EP-B-1 671 813 discloses using a PET cord having an elastic modulus of not less than 2.5 mN/dtex % under a load of 29.4 N measured at 160° C. for the belt bandage plies of pneumatic vehicle tires. The cord is moreover treated with an adhesion-promoting composition comprising a thermoplastic polymer, a heat-curable, aqueous polyurethane resin and an epoxy resin compound. It is further customary to use nylon cords, in particular PA 6.6, in the bandage plies of a pneumatic vehicle tire. Due to the comparatively low tensile modulus of nylon cords, it is necessary for certain use cases, in particular when the high-speed durability of the tire is important, to provide two bandage plies with nylon cords as strength members. The main objective of bandage plies in tires is that of preventing relative movement at the lateral belt ply edges to avoid separation of the belt ply edges.

The invention is based on the object of providing an rPET cord for the belt bandage ply or plies which, even in the case of a single-ply configuration of the bandage, ensures that the tire exhibits good high-speed durability, a long service life and a reduced flat-spot effect.

The stated object is achieved according to the invention when at a force of 1.56 cN/dtex the rPET cord has an elongation of 2% to 5% at 20° C. and an elongation of 6% to 9% at 120° C., when the sum of the breaking elongation of the rPET cord and the heat shrinkage determined at 180° C. at a preload force of 0.01 cN/dtex and a time of exposure of two minutes is greater than 17% and when the rPET cord has a heat shrinkage determined at 180° C. at a preload force of 0.01 cN/dtex and a time of exposure of two minutes of greater than 2.5%.

A belt bandage ply provided with such an rPET cord in the pneumatic vehicle tire is environmentally friendly, efficaciously prevents belt edge separation, ensures good high-speed durability, a long service life of the tire and reduces the flat-spot effect.

A filament yarn made of recycled PET (rPET) typically has a lower modulus than a filament yarn made of non-recycled PET. The rPET cord properties according to the invention are surprisingly achieved by a net stretch (sum of stretching of the strength member in the individual ovens upon passing through the converting process) of 3% to 6%, preferably of 3.5% to 5%. A cord made of non-recycled PET having a comparable tensile modulus is subjected to a maximum net stretch of 1.5%. The converting process comprising stretching of relevant strength members is well known to those skilled in the art.

Some cord parameters are particularly important in helping to achieve these effects. The overall fineness of the cord is important for example; the rPET cord according to the invention should have an overall fineness between 500 dtex and 6000 dtex, in particular between 500 dtex and 3500 dtex. Furthermore, the rPET cord should have a cord twist between 150 tpm and 650 tpm, in particular between 200 tpm and 650 tpm.

An arrangement of the rPET cord according to the invention in the bandage ply with 60 epdm to 160 epdm, in particular with 80 epdm to 140 epdm, has proven to be particularly advantageous for preventing separation of the belt ply edges, for good high-speed durability and a long service life of the tire. Only a single bandage ply is required.

In a further embodiment, a pneumatic vehicle tire according to the invention has a multi-ply, in particular 2-ply, belt bandage.

Further features, advantages and details of the invention will now be described in more detail on the basis of the drawing, which illustrates an exemplary embodiment. The sole FIGURE, FIG. 1, schematically shows a cross section through a pneumatic vehicle tire.

The pneumatic vehicle tire shown in FIG. 1 is a tire for passenger cars of radial construction and comprises a tread 1, sidewalls 2, bead regions 3 having bead cores 4 and bead profiles 5, a carcass ply 6, which circumferences the two bead cores 4, an inner layer 7, and a belt bandage 8 arranged between the carcass ply 6 and the tread 1. In the embodiment shown the belt bandage 8 comprises two belt plies 8a and 8b which in known fashion may consist of parallel strength members made of steel cord that are embedded in a rubber mixture. The steel cords in one belt ply 8a cross the steel cords in the other belt ply 8b and enclose with the tire circumferential direction one of the customary angles in the order of magnitude of 20° to 35°. Radially outside the two belt plies 8a, 8b is a bandage ply 9—a cap ply—which is formed by continuous and helical winding of a cord 10 made of rPET (recycled polyethylene terephthalate) in the circumferential direction of the tire and covers the lateral peripheral edges of the belt bandage 8.

Employed according to the invention is an rPET cord 10 of the construction 1100 dtex×2 or 1440 dtex×2 or 720 dtex×2 or 550 dtex×2 or 1670 dtex×2 having the following properties: Under the influence of a force of 1.56 cN/dtex the elongation of the cord 10 is between 2% and 5% at a temperature of 20° C. and between 6% and 9% at a temperature of 120° C. At a preload force of 0.01 cN/dtex effective over a period of two minutes and at a temperature of 180° C. the sum of breaking elongation and heat shrinkage is greater than 17%. Furthermore, the heat shrinkage at 180° C. and under the influence of a preload force of 0.01 cN/dtex, duration of exposure two minutes, is greater than 2.5%. The net stretch (sum of stretching of the strength member in the individual ovens upon passing through the converting process) is in a range from 3% to 6%, preferably in a range from 3.5% to 5%.

The rPET cord 10 according to the invention has an overall fineness between 1100 dtex and 3340 dtex. The rPET cord 10 is especially employed with a cord twist between 150 and 650 tpm (turns per meter), in particular between 200 tpm and 650 tpm.

The mutual spacing upon winding the rPET cord 10 to form the belt bandage is adjusted such that the finished bandage ply has between 60 and 160 epdm (ends per decimeter). In a preferred embodiment of the invention, the bandage ply 9 has between 80 epdm and 140 epdm.

A tire having a single bandage ply 9 configured according to the invention has a high-speed durability comparable to that of tires having known two-ply bandage configurations comprising nylon 6.6 as the strength member. A further advantageous effect of the bandage ply according to the invention is that of better robustness toward shock stresses without there being a risk of cord breakages in the belt plies. Compared to the typically employed nylon cords a tire configured according to the invention exhibits a markedly reduced flat-spot effect (a temporary deformation of the footprint of the tire when parked) and is more environmentally friendly than conventional cords.

LIST OF REFERENCE NUMERALS

1 Tread
2 Sidewall
3 Bead region
4 Bead core
5 Bead profile
6 Carcass ply
7 Inner layer
8 Belt bandage
8a Belt ply
8b Belt ply
9 Bandage ply
10 rPET cord

The invention claimed is:

1. A pneumatic vehicle tire having a radial construction, the tire comprising:
   a tread;
   a radial carcass;
   a belt bandage having a belt bandage ply of a plurality of plies;
   the belt bandage ply comprising a recycled cord of at least two multifilament yarns twisted together and arranged parallel to one another inside the belt bandage ply where the multifilament yarns of the recycled cord comprise recycled polyethylene terephthalate (rPET);
   the recycled cord having an elongation of 2% to 5% at 20° C. and an elongation of 6% to 9% at 120° C. at a force of 1.56 cN/dtex;
   a sum of a breaking elongation of the recycled cord (10) and a heat shrinkage determined at 180° C. at a preload force of 0.01 cN/dtex and a time of exposure of two minutes is greater than 17%;
   the recycled cord (10) has a heat shrinkage determined at 180° C. at a preload force of 0.01 cN/dtex and a time of exposure of two minutes of greater than 2.5%;
   the recycled cord is a strength member and has a net stretch in a range from 3% to 6%; and
   the recycled cord has an overall fineness between 500 dtex and 3500 dtex and a cord twist between 200 tpm and 650 tpm.

2. The tire of claim 1, the recycled cord is arranged in the belt bandage ply having a mutual spacing with 80 epdm to 140 epdm.

3. The tire of claim 1, the recycled cord configured to mitigate temporary deformation of the tire when parked without breaking from shock stresses.

4. The tire of claim 1, further comprising:
   sidewalls;
   bead regions having bead cores;
   the radial carcass circumferences the bead cores;
   an inner layer;
   the belt bandage arranged between the radial carcass and the tread; and
   a cap ply covers lateral peripheral edges of the belt bandage and comprises the recycled cord.

5. The tire of claim 1, the rPET of the recycled cord comprising recovered PET material.

6. The tire of claim 1, the recovered PET material being processed from fiber extruded used PET material.

7. A pneumatic vehicle tire having a radial construction, the tire comprising:
   a tread;
   a radial carcass;
   a belt bandage having a belt bandage ply of a plurality of plies;
   the belt bandage ply comprising a recycled cord of at least two multifilament yarns twisted together and arranged parallel to one another inside the belt bandage ply where the multifilament yarns of the recycled cord comprise recycled polyethylene terephthalate (rPET);
   the recycled cord having an elongation of 2% to 5% at 20° C. and an elongation of 6% to 9% at 120° C. at a force of 1.56 cN/dtex;
   a sum of a breaking elongation of the recycled cord (10) and a heat shrinkage determined at 180° C. at a preload force of 0.01 cN/dtex and a time of exposure of two minutes is greater than 17%;
   the recycled cord (10) has a heat shrinkage determined at 180° C. at a preload force of 0.01 cN/dtex and a time of exposure of two minutes of greater than 2.5%;
   the recycled cord is a strength member and has a net stretch in a range from 3% to 6%; and
   the recycled cord has a cord twist between 200 tpm and 650 tpm; and
   the recycled cord has an overall fineness between 500 dtex and 6000 dtex.

* * * * *